United States Patent [19]

Bryer

[11] Patent Number: 5,371,642
[45] Date of Patent: Dec. 6, 1994

[54] TAPE DRIVE ASSEMBLY WITH AN AUTOMATIC DOOR OPENING/CLOSING MECHANISM

[75] Inventor: Phil Bryer, Tarzana, Calif.

[73] Assignee: Wangtek, Simi Valley, Calif.

[21] Appl. No.: 975,650

[22] Filed: Nov. 13, 1992

[51] Int. Cl.⁵ .................................. G11B 5/008
[52] U.S. Cl. ......................... 360/96.5; 360/93
[58] Field of Search ............ 360/69, 71, 72.3, 81, 360/83, 84, 85, 88, 90, 93, 96.1, 96.5

[56] References Cited

U.S. PATENT DOCUMENTS

| | | | |
|---|---|---|---|
| 2,941,738 | 6/1960 | Burke et al. | 360/92 |
| 2,941,739 | 6/1960 | Burke et al. | 360/92 |
| 3,604,862 | 9/1971 | Ban | 360/93 |
| 3,659,857 | 5/1972 | Marcinkus | 360/93 |
| 3,697,085 | 10/1972 | Ban | 360/93 |
| 3,860,964 | 1/1975 | Kozu et al. | 360/92 |
| 3,869,722 | 3/1975 | Iwasaki | 360/92 |
| 3,976,262 | 8/1976 | Kennedy | 242/192 |
| 4,099,686 | 7/1978 | Moya | 242/198 |
| 4,233,638 | 11/1980 | Bolick, Jr. et al. | 360/92 |
| 4,303,955 | 12/1981 | Kramer et al. | 360/93 |
| 4,313,143 | 1/1982 | Zarr | 360/92 |
| 4,361,859 | 11/1982 | Schatteman | 360/96.5 |
| 4,386,382 | 5/1983 | Cutler et al. | 360/92 |
| 4,498,112 | 2/1985 | Georgens et al. | 260/96.5 |
| 4,514,775 | 4/1985 | Manning et al. | 360/96.6 |
| 4,556,923 | 12/1985 | Olmsted | 360/93 |
| 4,559,571 | 12/1985 | Olmsted et al. | 360/105 |
| 4,573,091 | 2/1986 | Barton, Jr. et al. | 360/93 |
| 4,586,095 | 4/1986 | Olmsted | 360/93 |
| 4,594,042 | 6/1986 | Hoffman | 414/32 |
| 4,608,615 | 8/1986 | Zeavin | 360/46.5 |
| 4,636,888 | 1/1987 | Sidebottom | 360/92 |
| 4,636,890 | 1/1987 | Rudi et al. | 360/96.5 |
| 4,642,714 | 2/1987 | Miyamoto | 360/96.5 |
| 4,662,606 | 3/1987 | Rudi | 360/96.5 |
| 4,673,995 | 6/1987 | Spiegelstein | 360/93 |
| 4,677,508 | 6/1987 | Barton, Jr. et al. | 360/96.5 |
| 4,739,951 | 4/1988 | Zeavin | 242/209 |
| 4,755,900 | 7/1988 | Zarr | 360/130.1 |
| 4,785,363 | 11/1988 | Jacobs et al. | 360/93 |
| 4,796,120 | 1/1989 | Komatsu et al. | 360/96.5 |
| 4,802,035 | 1/1989 | Ohtsuka | 360/92 |
| 4,807,067 | 2/1989 | Spiegelstein | 360/93 |
| 4,866,552 | 9/1989 | Nagase | 360/96.5 |
| 4,910,619 | 3/1990 | Suzuki et al. | 360/92 |
| 4,918,548 | 4/1990 | O'Donnell et al. | 360/92 |
| 4,933,790 | 6/1990 | Mitumaru | 360/96.5 |
| 4,937,690 | 6/1990 | Yamashita et al. | 360/92 |
| 5,025,334 | 6/1991 | Perona et al. | 360/96.5 |
| 5,089,920 | 2/1992 | Bryer et al. | 360/92 |
| 5,105,317 | 4/1992 | Sugiyama et al. | 360/96.5 X |
| 5,109,308 | 4/1992 | Kukreja et al. | 360/93 |
| 5,121,268 | 6/1992 | Nakayama et al. | 360/96.5 X |
| 5,212,606 | 5/1993 | Park | 360/96.5 X |

FOREIGN PATENT DOCUMENTS

| | | |
|---|---|---|
| 0170434 | 2/1986 | European Pat. Off. |
| 0241238 | 10/1987 | European Pat. Off. |
| 0394581 | 10/1990 | European Pat. Off. |
| 3721798A1 | 1/1988 | Germany |

*Primary Examiner*—Andrew L. Sniezek
*Attorney, Agent, or Firm*—Blakely, Sokoloff, Taylor & Zafman

[57] ABSTRACT

A compact tape drive assembly that has a door which is completely closed when a tape is inserted into the drive unit.

2 Claims, 6 Drawing Sheets

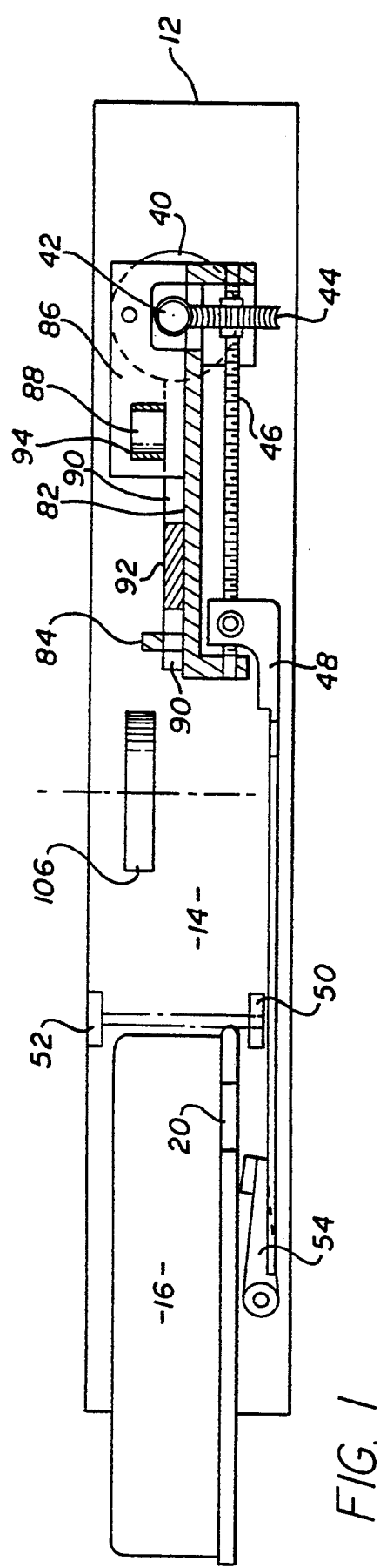
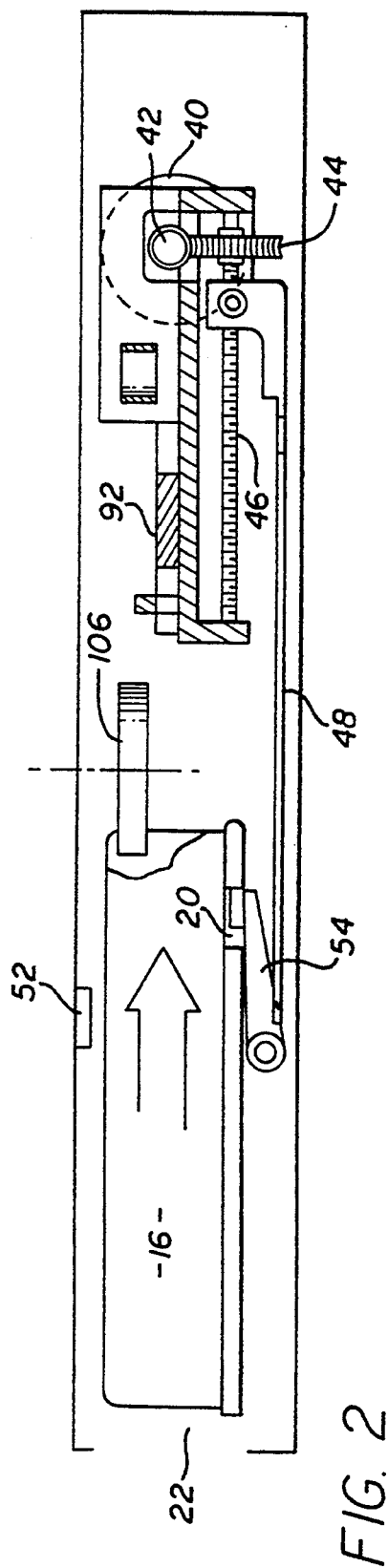
FIG. 1
FIG. 2

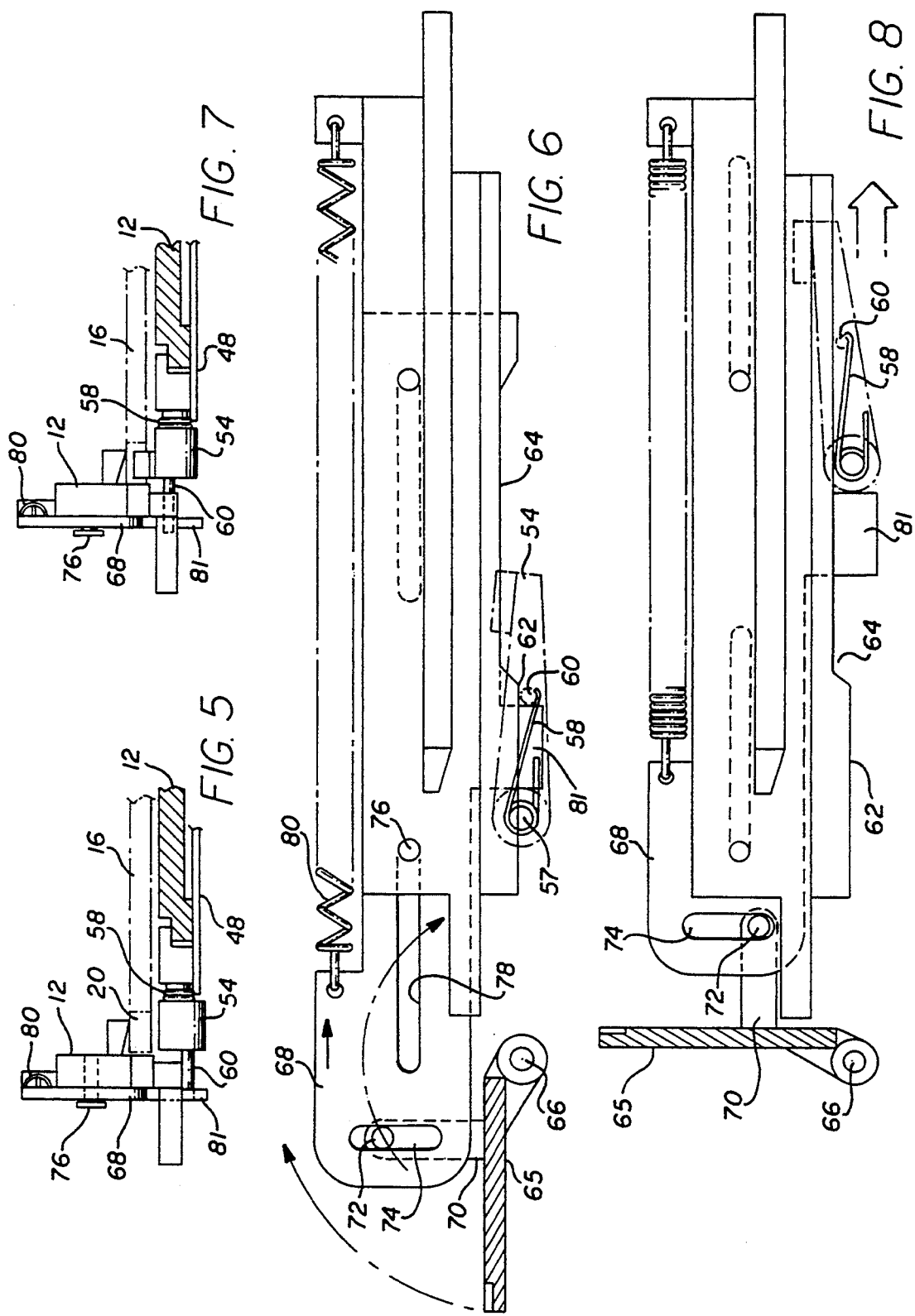

TAPE DRIVE ASSEMBLY WITH AN AUTOMATIC DOOR OPENING/CLOSING MECHANISM

BACKGROUND OF THE INVENTION

1. Field of the Invention

The present invention relates to a tape drive assembly.

2. Description of Related Art

Tape drive assemblies are commonly used to operate tape cassettes that store information from a computer. The tape cassettes have a large memory capacity and are typically used to provide a back-up copy of the information. Such back-up tape systems are sometimes found in portable computers which are susceptible to damage, particularly the hard disk drive of the computer. The tapes are typically accessible to the user, so that the tapes can be removed and stored for later use. To be compatible with a portable computer system, it is desirable to construct the tape drive assembly as small and light as possible.

Conventional compact tape drive assemblies typically have a door that encloses the assembly when a tape is not inserted into the drive unit. The door prevents contaminants from entering the drive and damaging the computer. When a tape cassette is inserted into the tape drive, the door rest on the cassette in a partially open position, so that the tape can be ejected from the drive. In a portable computer, the tape cassette is typically inserted into the drive unit for an extended period of time so that information may be readily stored onto the tape. This is particularly true for systems with automatic back-up routines. Leaving the tape within the tape drive creates an opening in the system, wherein contaminants may enter the computer through the partially open tape door. It would therefore be desirable to provide a tape drive assembly which can be used in a portable computer and which has a door that is completely closed when the tape is inserted into the drive. Such a door must be constructed so that the tape can still be readily ejected from the tape drive assembly.

It would be preferable to provide a 1 inch high tape drive assembly that has a door that fully retracts. Such a door looking mechanism must be compact enough to fit within the 1 inch profile, while providing enough space for the magnetic head, capstan motor and the tape itself.

SUMMARY OF THE INVENTION

The present invention is a tape drive assembly which has a door that is completely closed when a tape is inserted into the drive unit. The tape drive is constructed small enough to be used in a portable computer and preferably has dimensions of approximately 5.75 inches by 4.0 inches by 1.0 inch. The 1.0 inch high profile requires a door actuating mechanism that is small enough to operate with the tape, magnetic head assembly and capstan motor assembly. In the preferred embodiment, the tape drive assembly has an electric motor which is coupled to a slide and a latch. The electric motor is adapted to move the slide and latch between a retracted position and an ejected position. The tape drive also has a sensor which activates the motor when a tape is inserted into the drive assembly. The activated motor initiates movement of the slide from the ejected position to the retracted position.

The latch is coupled to a cam mechanism which rotates the latch into slots within the tape, when the slide initially moves from the ejected position to the retracted position. Further movement of the slide moves the tape into contact with the capstan and the magnetic head of the drive. The assembly has a manual switch which activates the electric motor to move the slide and tape back into the ejected position. The cam mechanism disengages the latch from the tape, so that the tape can be removed from the drive.

The tape drive assembly has a door that is pivotal connected to the housing of the assembly. The door is coupled to the slide by a linkage mechanism which rotates the door into a closed position when the slide is moved to the retracted position by the electric motor. Movement of the slide into the ejected position rotates the door into an open position, so that the tape can be removed from the tape drive. The door completely encloses the tape drive when the tape is inserted into the drive unit, thereby preventing contaminants from entering the computer through the tape opening.

Therefore it is an object of the present invention to provide a tape drive assembly which can be used in a portable computer and has a door that completely closes when a tape is inserted into the tape drive.

It is also an object of the present invention to provide a tape drive assembly that is small and lightweight.

BRIEF DESCRIPTION OF THE DRAWING

The objects and advantages of the present invention will become more readily apparent to those ordinarily skilled in the art after reviewing the following detailed description and accompanying drawings, wherein:

FIG. 1 is a cross-sectional side view of a tape drive assembly showing a tape in an ejected position;

FIG. 2 is a view similar to FIG. 1 showing the tape moved into a retracted position;

FIG. 5 is a sectional view showing a latch mechanism when the tape is in the ejected position;

FIG. 6 is a side view of the latch mechanism of FIG. 5;

FIG. 7 is a view similar to FIG. 5 showing the latch mechanism when the tape is in the retracted position;

FIG. 8 is a view similar to FIG. 6 showing the latch mechanism when the tape is in the retracted position;

DETAILED DESCRIPTION OF THE INVENTION

Figure 3:
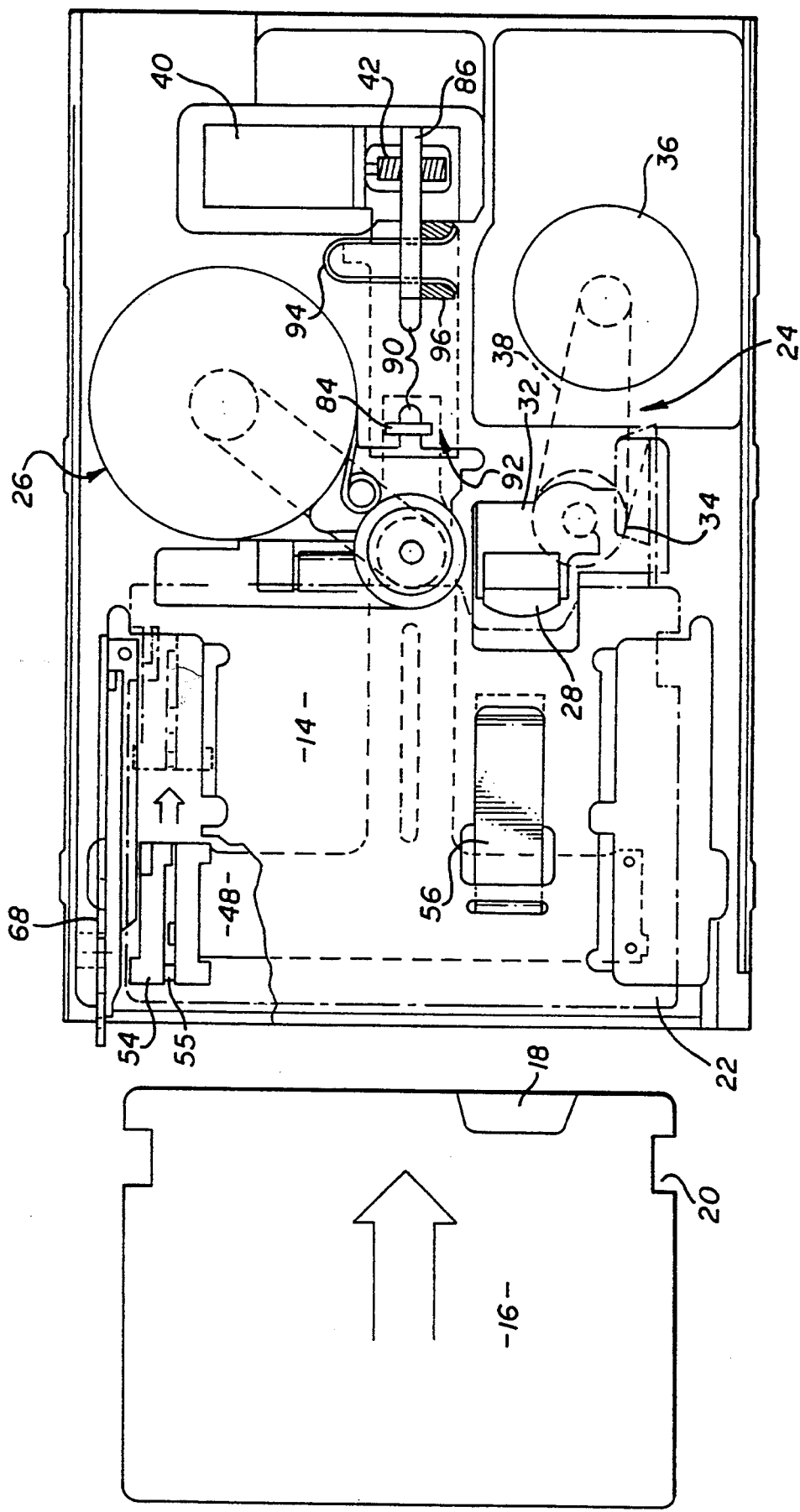
FIG. 3 is a cross-sectional top view of the tape drive assembly.

Referring to the drawings more particularly by reference numbers, FIGS. 1-4 show a tape drive assembly 10 of the present invention. The tape drive assembly 10 is typically used in a portable computer. The tape drive assembly 10 has a housing 12 which defines an inner cavity 14 that is adapted to receive a cassette tape 16. The cassette tape 16 is accessible to the user, so that the tape can be removed and stored for later use. The housing is 10 preferably constructed to have dimensions of approximately 5.75 inches by 4.0 inches by 1.0 inch. The cassette 16 has a window 18 that provides access to an internal magnetic tape. The housing of the cassette also has a pair of slots 20. The cassette tape can be manually inserted into the cavity 14 through an opening 22.

Figure 4:
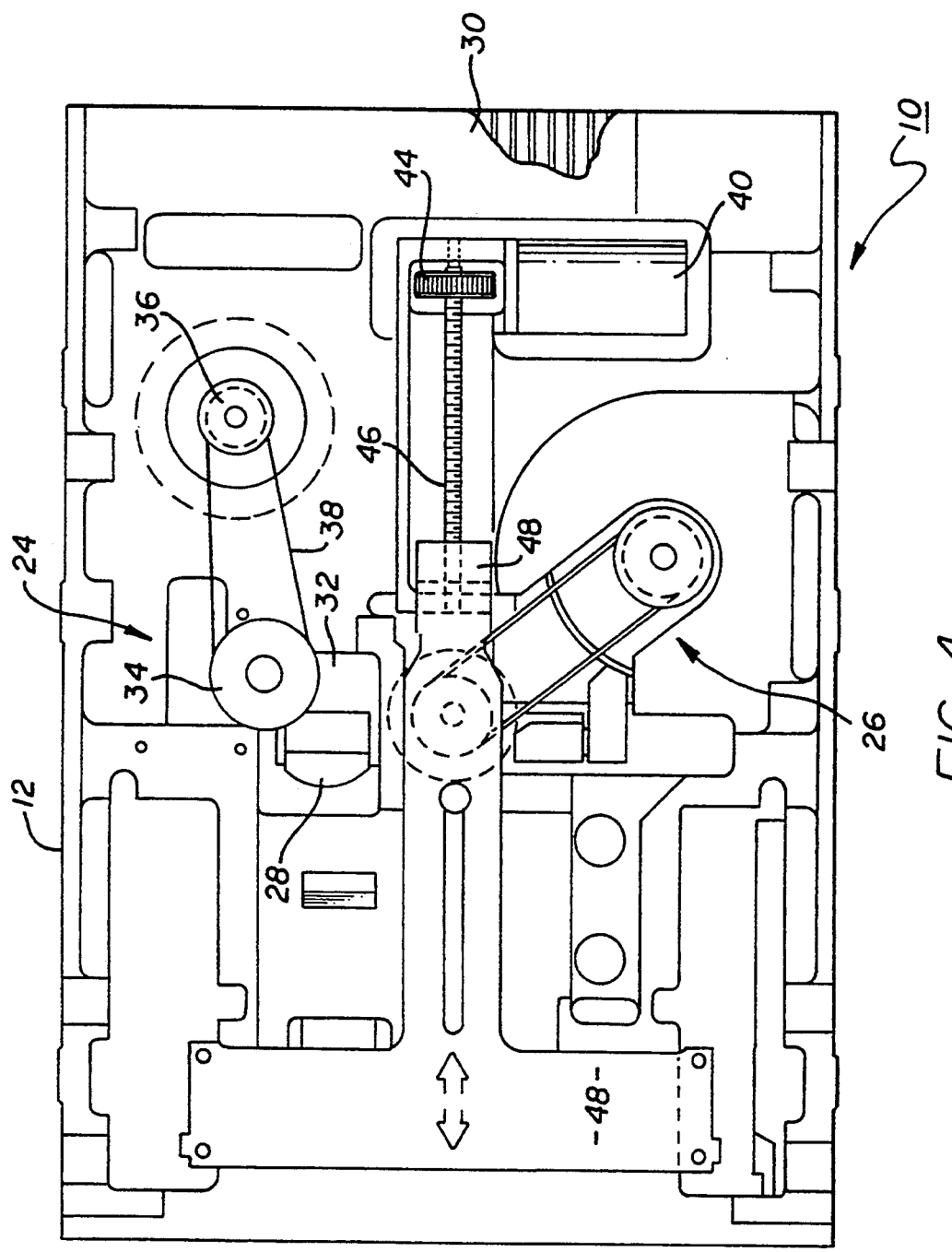
FIG. 4 is a cross-sectional bottom view of the tape drive assembly.

As shown in FIGS. 3 and 4, the tape drive assembly 10 includes a magnetic head assembly 24 and a capstan assembly 26. The magnetic head assembly 24 includes a magnetic head 28 that can magnetize or sense the magnetic field of the tape 16. The magnetic head 28 is coupled to the computer by a connector 30 and control logic (not shown) within the tape drive. The magnetic head 28 is mounted to an arm 32 which is coupled to a gear wheel 34. The wheel 34 is coupled to a stepping motor 36 by a belt 38. The stepping motor 36 can rotate the gear wheel 34 and move the arm 32 and magnetic head 28 relative to the tape 16.

The tape drive 10 also contains an electric drive motor 40 that has a worm gear 42. As shown in FIG. 1, the worm gear 42 is coupled to a pinion gear 44 that is mounted to a screw 46. The screw 46 is connected to a slide 48 that extends across the length of the housing 12. The slide 48 has an internal thread that is coupled to the screw 46, such that the slide 48 translates when the screw 46 is rotated by the electric motor 40. The electric motor 40 can move the slide 48 between a retracted position (FIG. 2) and an ejected position (FIG. 1).

As shown in FIGS. 1 and 2, the tape drive 10 has a photodiode 50 which emits a beam of light across the inner cavity 14 to a photo-sensor 52. The photo-sensor 52 provides a switch for the electric drive motor 40, such that the motor 40 is activated when the sensor 52 no longer senses the light beam. Therefore, when a tape 16 is inserted into the drive 10, the tape housing breaks the light beam, which activates the motor 40 and moves the slide 48. Attached to the slide 48 is a latch 54 which is rotated into the tape slots 20 when the slide 48 moves toward the retracted position. Subsequent movement of the slide 48 moves the tape 11 into operative engagement with the capstan assembly 26 and the magnetic head 28. In the preferred embodiment, the assembly 10 has a pair of latches 54 which each rotate into the tape slots 20. As shown in FIG. 3, the assembly may also have a spring 56 that holds the tape 16 within the housing 12.

As shown in FIGS. 5-8, the latches 54 are pivotal connected to the slide 48 by pin 57. Each latch 54 is coupled to a torsion spring 58 by a pin 60. The pin 60 is adapted to move along a cam surface 62 of the housing 12. As shown in FIGS. 6 and 8, when the slide 48 moves from the ejected position to the retracted position, the pin 60 moves into a cam slot 64 in the cam surface 62. As shown in FIG. 7, movement of the pin 60 allows the torsion spring 58 to rotate the latch 54 into the tape slot 20. As shown in FIG. 6, when the slide 48 is moved into the ejected position, the pin 60 moves out of the cam slot 64 and the latch 54 rotates out of the tape slot 20.

As shown in FIGS. 6 and 8, a door 65 is pivotal connected to the housing 12 by pin 66. The door 65 is adapted to rotate between an open position and a closed position. In the closed position, the door 65 completely encloses the inner cavity 14 of the drive assembly 10. The door 65 is coupled to a plate 68 by an arm 70 which has a cam pin 72 that moves within a cam slot 74 of the plate 68. The plate 68 is coupled to the housing 12 by pins 76 that extend through a pair of slots 78 within the plate 68. Attached to the housing 12 and the plate 68 is a compression spring 80 which biases the door 64 into the close position. In the preferred embodiment, there are typically two plates 68 per assembly.

Each plate 68 has a tab 81 that is adapted to engage the pin 60 of the latch 54. As shown in FIG. 6, when the slide 48 is moved from the retracted position to the ejected position, the pin 60 engages the tab 81 and pushes the plate 68 into an outward direction. Movement of the plate 68 rotates the door 65 into the open position. When the slide 48 is moved to the retracted position, the pin 60 is released from the tab 81 and the spring 80 pulls the plate 68 and door 65 into the closed position.

As shown in FIGS. 1-4, the electric drive motor 40 is preferably mounted to a carriage 82 which has a T shaped first flange 84 and a second flange 86 that has a slot 88. The flanges support the carriage 82 within a pair of slots 90 in a baseplate 92 of the housing 12, such that the carriage 82 can move relative to the housing 12. The carriage 82 is secured to the housing by a spring 94 that is inserted through slot 88 and is captured by a pair of studs 96 that extend from the baseplate 92. The screw 46 and gear 44 are also supported by the carriage 82. The spring 94 allows the motor 40 to move relative to the housing 12 when the slide 48 engages the gear 44 during movement into the retracted position. The spring 44 also biases the tape toward the capstan motor assembly. The spring 94 supplies a force sufficient to overcome the spring force of the capstan assembly and any typical shock load that is applied to the tape drive.

In operation, the tape 16 is inserted into the inner cavity 14 until the light beam is broken. The electric drive 40 motor is then activated to turn the gears 42 and 44 and the screw 46. Rotation of the screw 46 moves the slide 48, which rotates the latches 54 into the tape slots 20. Further movement of the slide 48 pulls the tape 16 into engagement with the magnetic head 28 and the capstan assembly 26. Movement of the slide also moves the plate 68 which pulls the door 64 into the closed position. The motor rotates until the spring 94 is deflected a predetermined value. The tape drive 10 may have photo-sensing system 98 which senses the deflection of the spring and turns the motor 40 off. The tape drive assembly typically has a manual button (not shown) which can be depressed by the user. When the button is depressed, the electric drive motor 40 rotates in an opposite direction, moving the slide 48 and rotating the latches 54 out of the tape slot 20. The slide 48 movement also moves the plate 68, which rotates the door 64 into the open position so that the tape 16 can be removed from the tape drive 10. When the tape is removed, the assembly has logic to energize the motor and close the door. The assembly may also have a manual button that can be depressed to initiate a sequence wherein the door is opened for subsequent tape insertion. As an alternative embodiment, the manual button can be replaced with an electrical switch operated under software or firmware control.

Figure 9:
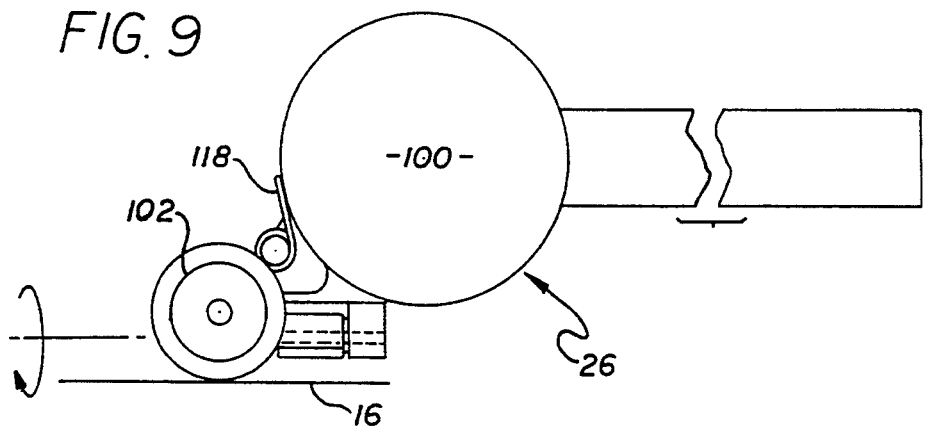
FIG. 9 is a top view of a capstan motor assembly.
Figure 10:
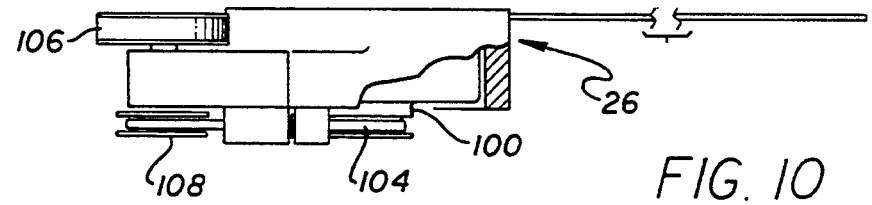
FIG. 10 is a front view of the capstan motor assembly.
Figure 11:
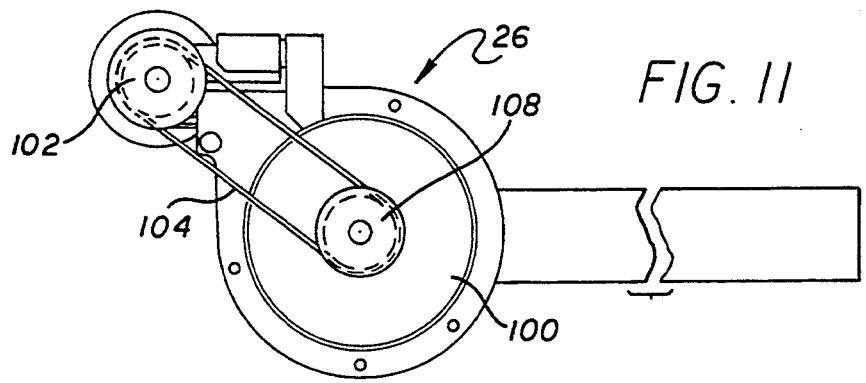
FIG. 11 is a bottom view of the capstan motor assembly.
Figure 12:
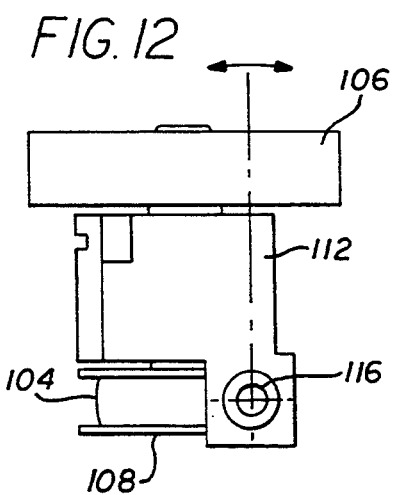
FIG. 12 is a side view of the capstan motor assembly.
Figure 13:
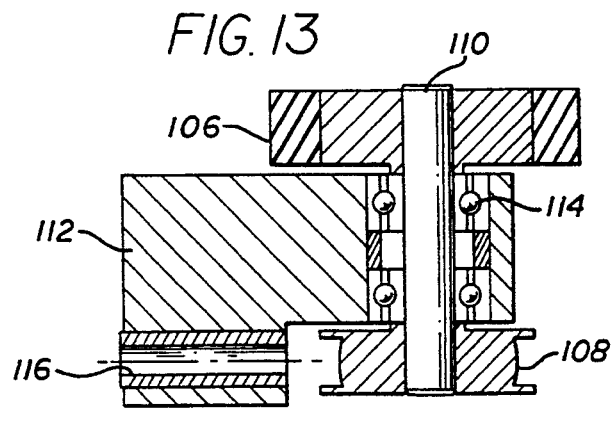
FIG. 13 is a cross-sectional view of the capstan motor assembly.

FIGS. 9-13 show a capstan motor assembly 26 of the present invention. The assembly 26 includes an electric motor 100 that is coupled to a wheel 102 by a belt 104. The motor 100 rotates the wheel 102, which moves the tape of cassette tape 16. As shown in FIGS. 10, 12, and 13, the wheel 102 has a bumper section 106 which engages the tape and a pulley section 108 that is coupled to the belt 104. The pulley section 108 and bumper section 106 are connected by a shaft 110 that is coupled to a capstan wheel housing 112 by bearings 114. The capstan wheel housing 112 is pivotal connected to the assembly housing 12 by a pivot pin 116. The pivot pin 116 allows the capstan wheel to rotate relative to the cassette tape 16.

The assembly further includes a torsion spring 118 which biases the wheel 102 into contact with the tape 16. When the tape is fully inserted into the drive 10, the wheel force of the tape rotates the 102 toward the motor 100, wherein the spring 118 provides a counter force to the bumper section 106 of the wheel. The spring 118 ensures constant contact between the wheel 102 and the tape of the cassette 16. In the preferred embodiment, the spring 118 is constructed to provide a spring force of approximately 15 ounces. Such a force has been found to prevent the wheel 102 from moving away from the tape 16 under normal shock or vibrational conditions.

As shown in FIGS. 9 and 11, the pivot pin 116 is preferably located in line with an outer point of the pulley section 108 that is normal to the tape 16. Such an arrangement prevents the belt 104 from lengthening when the wheel 102 rotates about the pin 116. Stretching the belt 104 may cause premature failure in the capstan assembly 26, thereby reducing the life of the tape drive 10.

Figure 14:
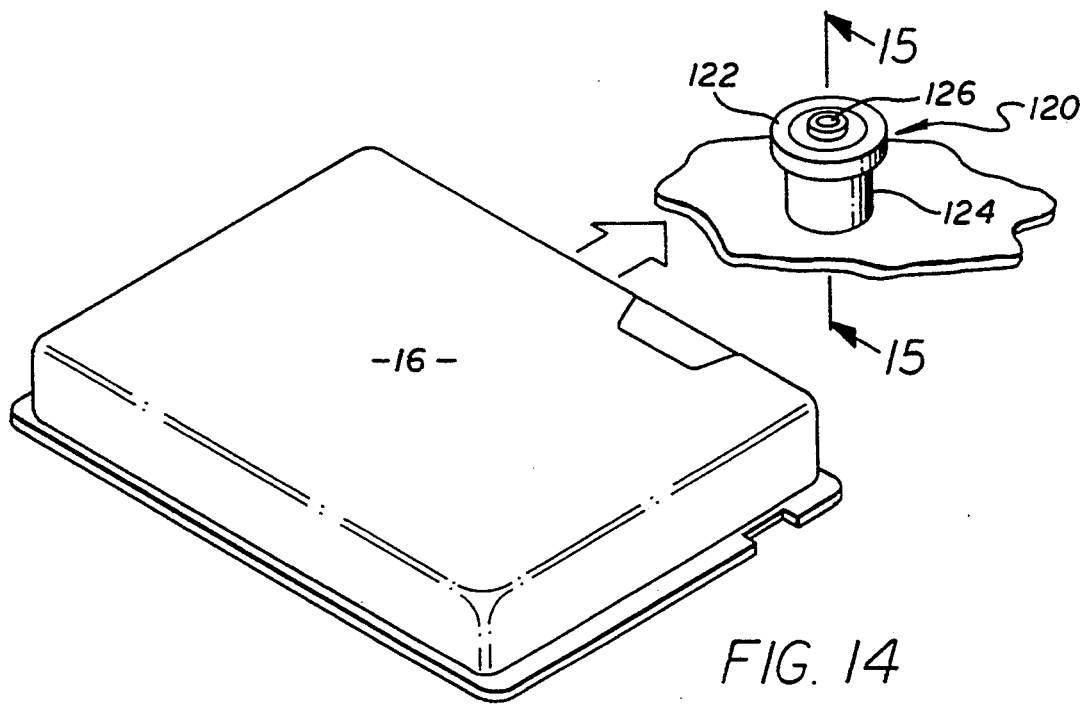
FIG. 14 is a perspective view of an alternate capstan motor assembly.
Figure 15:
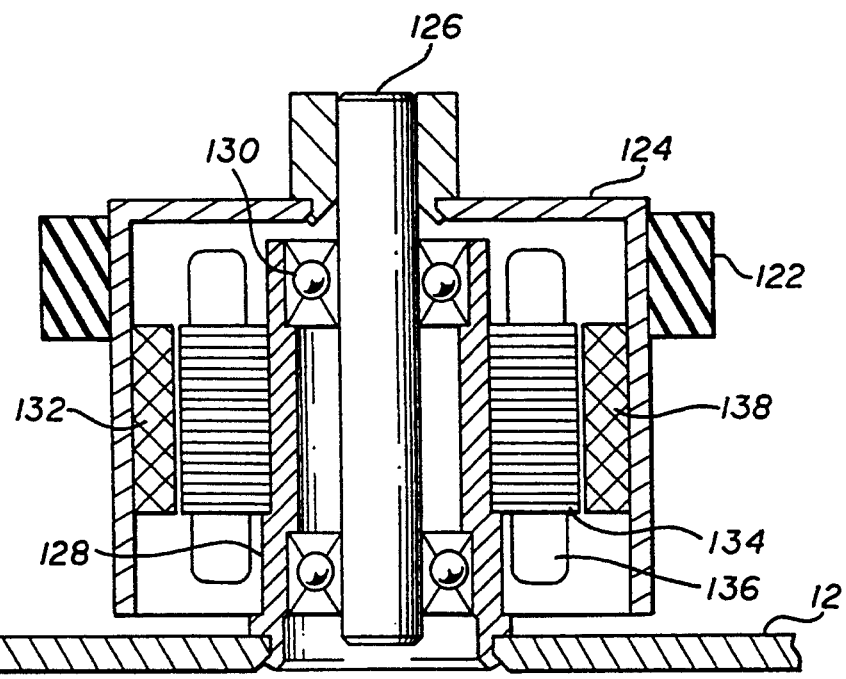
FIG. 15 is a cross-sectional view of the capstan motor assembly of FIG. 14.

FIGS. 14 and 15 show another embodiment of the capstan assembly. The capstan assembly 120 has a bumper 122 attached to a wheel 124. The bumper 122 is typically constructed from a rubber material which has a surface sufficient to drive the tape through friction. The wheel 124 is attached to a shaft 126 that is coupled to a motor mount 128 by bearings 130. The mount 128 is fixed to the housing 12. Attached to the mount 128 is an electric motor 132 which contains a coil 134 wrapped around a magnetic core 136. Mounted to the inner surface of the wheel 124 is a magnet 138 which is coupled to the coil 134 and core 136. Providing a current to the coil 134 induces a magnetic flux, which moves the magnet 138 and rotates the wheel 124 relative to the housing 12. The capstan wheel assembly 120 shown in FIGS. 14 and 15, significantly reduces the size and the number of components of capstan assemblies in the prior art.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A tape drive assembly for a tape cassette that has a tape slot, comprising:

a housing having an inner cavity and a slot that provides access to said inner cavity, said housing further having a cam surface;

a door that is attached to said housing and moves between an open position and a closed position;

a door plate operatively connected to said housing and said door;

a slide that can receive the tape cassette and move between a retracted position and an ejected position;

a motor that moves said slide between said retracted and ejected positions;

a latch that is attached to said slide and which can rotate into the tape slot when said slide moves to said retracted position, said latch having a pin which follows said housing cam surface and rotates said latch out of said tape slot and moves said door plate such that said door moves to said open position when said slide moves to said ejected position;

a first spring that is coupled to said latch pin and rotates said latch into the cassette slot when said slide moves into said retracted position; and, a second spring that biases said door to said closed position when said slide moves to said retracted position.

2. The tape drive assembly as recited in claim 1, wherein said door is pivotally connected to said housing and has a cam pin which moves within a cam slot of said door plate.

* * * * *